United States Patent Office

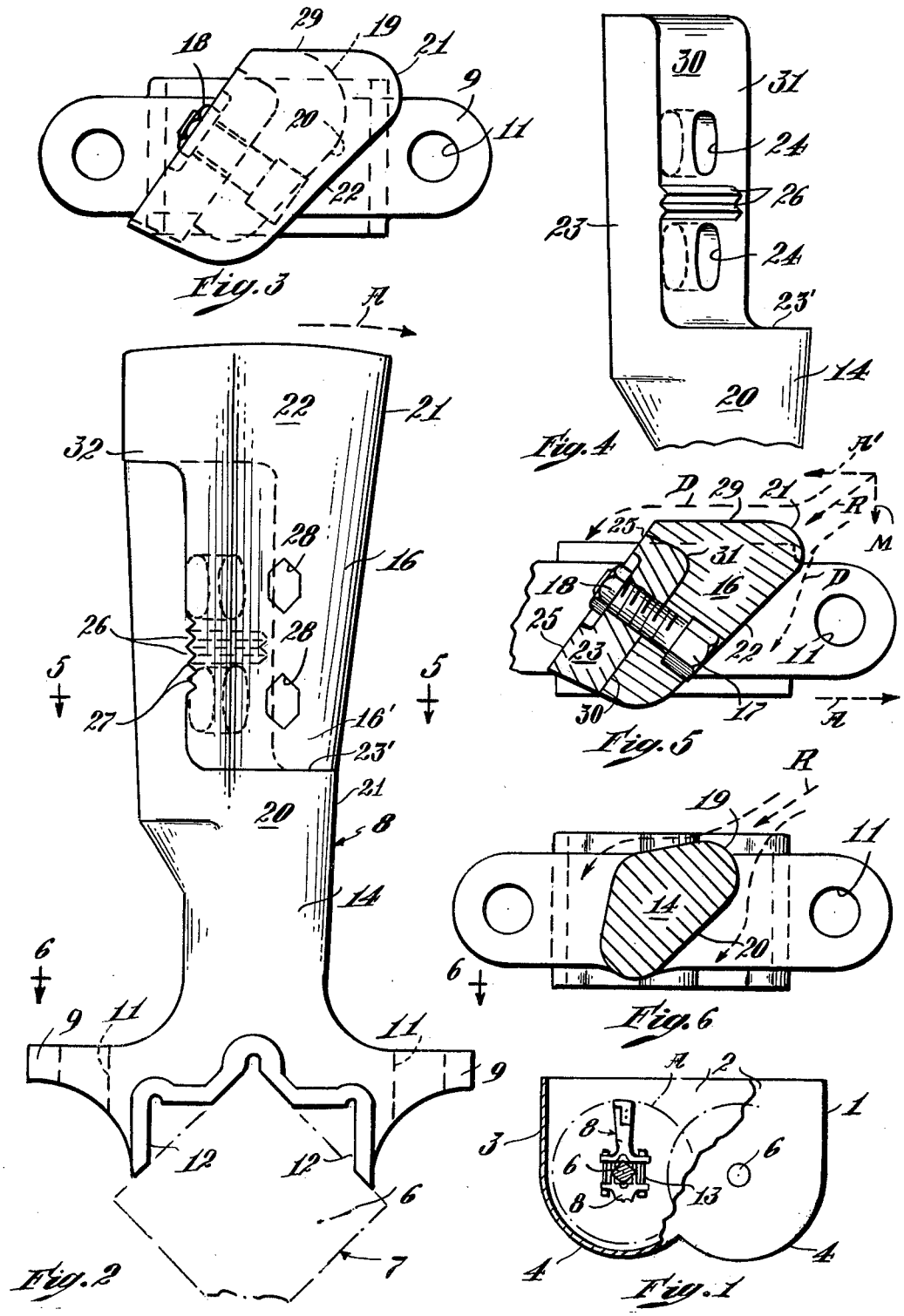

3,195,869
Patented July 20, 1965

3,195,869
MIXER FOR ABRASIVE AGGREGATES
Ralph C. Paine, Avon, Mass., assignor to Warren Brothers Company, Cambridge, Mass., a corporation of West Virginia
Filed Jan. 10, 1963, Ser. No. 250,641
1 Claim. (Cl. 259—144)

This invention relates to apparatus for mixing aggregates of abrasive materials such as sand and gravel usually with a binder, such as Portland cement or preferably a bituminous or asphaltic cement. Particularly, the invention involes a rotary arm used to stir and intimately mix the aggregate and binder. Typically two or more of such arms are mounted on parallel shafts extending lengthwise of an elongate trough. The arm includes an iron blade inclined to the shafts which both impels a stream of the mix through the trough and mixes its constituents.

Understandably the sand and gravel aggregate wears the rotary mixer arm rapidly, particularly at its outer end. Therefore the arm is provided at its outer end with a replaceable blade. However, to be readily replaceable the blade must be temporarily fastened to the shank of the arm. And it has hitherto not been possible to make blade fastening means which survive the violent abrasion to which the blade is subjected.

Accordingly it is an object of the present invention to provide a mixer arm shaped to prolong the life of the blade and the means for fastening it to the shank. It is a further object to protect the shank of the mixer arm in which the fastening means are anchored. Also it is an object to construct the arm for more efficient mixing.

According to the invention a mixer arm comprises a shank with an outer mounting member having a downstream face and an upstream edge, a blade, and threaded means detachably securing the blade to the mounting member, said threaded means extending to said downstream face, and said blade having a portion extending around the upstream edge of said mounting member to shield said edge against abrasion, said portion forming a shoulder inclined across the stream to deflect the stream away from said threaded means.

For the purpose of illustration a typical embodiment of the invention is shown in the accompanying drawing in which:

FIG. 1 is an end view of a mixing trough, partly broken away to show a mixer arm in elevation;
FIG. 2 is an enlarged elevation of the mixer arm;
FIG. 3 is a top view of the mixer arm;
FIG. 4 is an elevation of the mixer arm shank;
FIG. 5 is a section on line 5—5 of FIG. 2; and
FIG. 6 is a section on line 6—6 of FIG. 2.

As shown in FIG. 1 a typical mixing trough 1 comprises end and side walls 2 and 3 and a bottom with two concave portions 4 running lengthwise of the trough. The concave portions are curved concentrically with oppositely rotating shafts 6. The shafts 6 have rectangularly cross sectioned portions 7 on which are mounted mixer arms 8. The foot of each arm has flanges 9 provided with bolt holes, and a socket 12 shaped to fit on the rectangular shaft at one of several angles 45° apart. A pair of mixer arms is attached to the shaft by a pair of bolts 13 clamping the flanges of both blades on the shaft.

As shown in the remaining figures, each mixer arm comprises a shank 14 and a blade 16 secured to the shank with bolts 17 and nuts 18. Typically ten pairs of arms are attached to a shaft at half foot intervals along a five foot trough. Successive arms are offset 45° from each other. Normally the trough is filled with mix above the upper end of the arms.

The movement of the arm and abrasive mix in the trough is indicated by broken line arrows in FIG. 5. At the top of the left hand side of the trough the arm will have a rotary motion in the direction indicated by the arrow A. The movement of the mix relative to the arm has two components. Arrow A' indicates the component attributable to the rotary motion of the arm, and arrow M indicates the circulating motion of the mix lengthwise of the tank owing to the impelling action of the arm. The resultant motion R of the mix relative to the blade is at an angle to the rotating path A of the blade. This is the general direction of the stream of the mix relative to the blade, although the stream in passing the blade may be momentarily diverted on paths D around the blade.

With reference to the stream of the mix, the base of the shank, as shown in FIG. 6 is elongated so as to form an upstream edge 19, and downstream impelling shoulder. Prior round shanks contributed little to the agitation of the mix and nothing to the impelling of the mix lengthwise of the trough, thus leaving a zone parallel and close to the shaft 7 which was not properly mixed. In the present mixer arm the inclination of the substantial impelling face 20 relative to the direction A of blade rotation contributes to moving the mix through the trough.

The upstream edge 19 and impelling face 20 of the shank merge with a corresponding upstream edge 21 impelling surface 22 of the detachable blade 16 where the radially inner end 16' of the detachable blade 16 meets a ledge 23' on the shank 14, as shown in FIG. 2.

The shank 14 includes a mounting member 23 provided with bolt slots 24 and teeth 26 on its upstream face 30 interfitting with teeth 27 on the blade. This interfit is adjustable permitting radial lengthening of the arm. Small recesses in the rear face 25 of the mounting member at the back of the slots 24 are provided for receiving the nuts. The hexagonal heads of the nuts 17 are sunk in hexagonal sockets 28.

The blade 16 has a shoulder 29 extending from the leading edge 21 of the blade, which shoulder is inclined across the stream and extends over the forward edge 31 of the shank mounting member. The shoulder 29 not only protects the forward edge, but also owing to its inclination deflects the stream of abrasive mix away from the exposed nuts and bolt ends at the rear face 25 of the mounting member. Additionally the outer end of the blade has an enlarged hood portion 32 which covers the outer end of the mounting member 23.

From the inner to the outer end of the blade, the thickest section of the blade extends from the forward edge 31 of the shank upstream to the edge 21 of the blade. This additional thickness permits the impelling surface 22 and shoulder 29 to extend a substantial distance and thereby increases the impelling and deflecting action. The additional thickness is also along the path of wear which by abrasion progresses from the leading edge 21 in the direction of the resultant stream R. The action of the blade and its life are thus increased.

The life of the shank as well as the life of the blade are substantially lengthened. Wear of the nuts and bolts is minimized so that the blade must ultimately be replaced removal of the nuts requires only a wrench and avoids grinding or other like time consuming operations.

It should be understood that the present disclosure is for the purpose of illustration only and that this invention includes all modifications and equivalents which fall within the scope of the appended claim.

I claim:

A mixer arm for rotation through a body of abrasive mix comprising a shank and a blade detachably mounted thereon, said arm in its radially outer portion being comprised entirely of blade and being characterized in that it has a shoulder face disposed in alignment with the normal direction of rotation of said arm, a rounded upstream edge into which said shoulder face merges and which in turn merges into an impelling surface disposed at an acute angle to said direction of rotation, said arm having an intermediate portion comprising the radial inner portion of said blade and the radial outer portion of said shank, said radial outer portion of the shank constituting only that portion of the arm spaced from said shoulder base and said impelling surface, said arm in its intermediate section being further characterized in that a bore is provided normal to said impelling surface, said impelling surface being counterboard for the reception of a bolt head and said radial outer portion of the shank being recessed in the region of said bore for the reception of a nut to be threaded onto said bolt, said arm being further characterized in that a further radially innermore intermediate portion of said arm is comprised entirely of said shank, said arm being further characterized in that it retains the same cross sectional shape in both intermediate portions and outer portion, said arm gradually increasing in size in proportion to its radial dimension, said arm being further characterized in that the innermost section thereof has a configuration comprising an upstream edge and impelling face which constitutes a radial inward extension of said impelling surface and previously recited upstream edges.

References Cited by the Examiner

UNITED STATES PATENTS 1,555,964  10/25  Guedel _____ 259—178

FOREIGN PATENTS 264,374  1/27  Great Britain.
339,584  12/30  Great Britain.

WALTER A. SCHEEL, *Primary Examiner.*